June 12, 1962     W. C. WILSON     3,038,322
RELEASABLE COUPLING
Filed Sept. 16, 1960

William C. Wilson
INVENTOR.

BY R. Frank Smith
Steve W. Grembow
ATTORNEYS

# United States Patent Office 3,038,322
Patented June 12, 1962

3,038,322
RELEASABLE COUPLING
William C. Wilson, Rochester, N.Y., assignor to Eastman Kodak Company, Rochester, N.Y., a corporation of New Jersey
Filed Sept. 16, 1960, Ser. No. 56,502
4 Claims. (Cl. 64—8)

This invention relates generally to couplings, and more specifically to an improved separable coupling for transmitting rotary motion.

Although couplings are widely used for many applications in industry, the need still exists for an improved coupling for releasably connecting a driving member to a driven member for transmitting rotary motion. Most of the couplings presently in use in industry are of the permanent or semi-permanent type, and do not permit rapid coupling and uncoupling of the members. In addition, these couplings in most instances have to be constructed to close tolerances, and are often difficult to assemble. Also, in all of the couplings applicant is aware of, it is not possible to uncouple the driving and driven members while one of the members is rotating. A further disadvantage of most of the prior art couplings is that they are relatively complicated, constructed of many parts which have to be machined to close tolerances, and are relatively uneconomical to manufacture. The improved releasable coupling of this invention is believed to obviate many of the above-mentioned disadvantages of prior-known couplings.

One of the primary objects of the present invention is to provide an improved coupling for releasably connecting driving and driven members, and permitting rapid coupling and uncoupling of the members.

Another object of this invention is to provide a releasable coupling in which the tolerance in alignment between the driven and driving members need not be held to close limits.

Still another object of the invention is to provide an improved releasable coupling in which the driving and driven members may be coupled or uncoupled while either or both members are rotating.

A still further object of this invention is to provide an improved releasable coupling that is of simple design and construction, thoroughly reliable and efficient in operation, and economical to manufacture.

Figure 1:
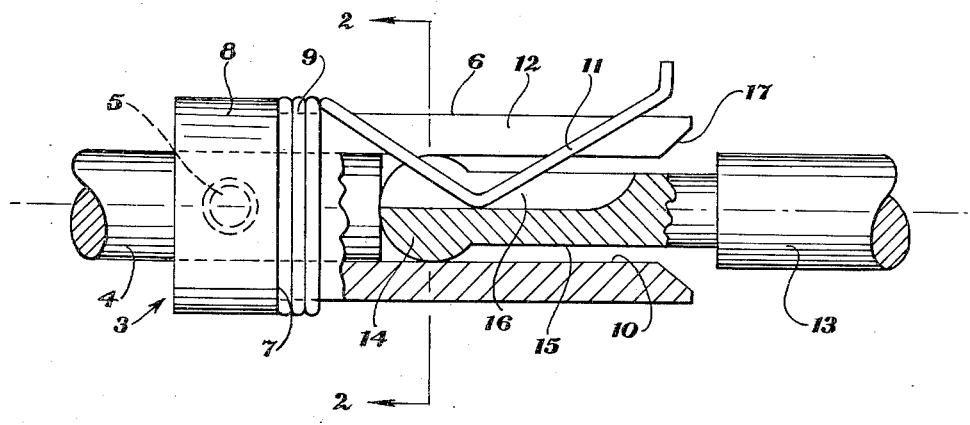
Figure 2:
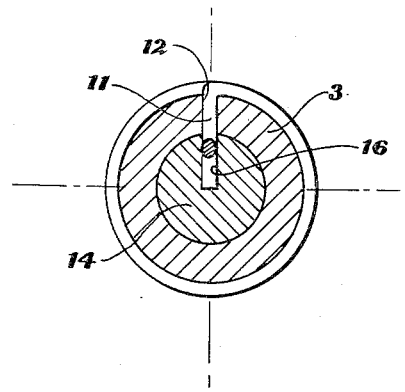

Objects and advantages other than those set forth above will be apparent from the following description when read in connection with the accompanying drawing, in which:

FIG. 1 is a side elevation view of a preferred embodiment of the present invention with a portion thereof broken away and sectioned; and FIG. 2 is a section view taken along line 2—2 of FIG. 1.

In the preferred embodiment of the invention as shown in the drawing, the driving member comprises a cylindrical sleeve 3 mounted on the end of a drive shaft 4 and rigidly secured thereto by means of a pin 5 passing through both sleeve 3 and shaft 4. The sleeve 3 has a portion 6 of reduced diameter terminating in a shoulder 7 which separates portion 6 from a shank 8 of the coupling. A helical spring 9 having an inside diameter slightly smaller than the outer diameter of portion 6 is pressed onto portion 6 and urged into engagement with shoulder 7. Spring 9 is wound so that when it is turned in one direction, it constricts and drivingly grips portion 6. The difference in outside diameter between portion 6 and shank 8 is substantially equal to the diameter of the wire from which helical spring 9 is formed, so that in assembly the outside diameter of helical spring 9 is equal to the outside diameter of shank 8. The spring 9 has an axially extending end 11 which is bent at right angles to the coils of spring 9. The spring end 11 is bent radially inwardly and outwardly in a substantially V-shaped configuration and the vertex of which extends to the axis of sleeve 3 through an axially extending slot 12 to portion 6 of sleeve 3 of a width slightly greater than the diameter of the wire of spring 9. With the V-shaped configuration of spring end 11, two axially spaced parts of end 11 extend across slot 12 and bear against its sides upon rotation of the driving member for transmitting torque to said driven member. The driven member comprises a shaft 13 having a spherical end or cam surface 14 of a diameter approximately equal to the inside diameter of a bore 10 formed by sleeve 3. Shaft 13 further has an undercut portion 15 adjacent spherical end 14 facing the inner periphery of sleeve 3 to provide a space therebetween to permit angular movement of shaft 13 about spherical end 14 with respect to sleeve 3. The shaft 13 further has an axially extending groove 16 adapted to receive spring end 11 for drivingly connecting the respective driving and driven shafts 4, 13. The sleeve 3 further has a beveled end 17 to facilitate the insertion of driven shaft 13 therein even though the two may not be in complete axial alignment. The spring end 11 is held in groove 16 by its normal resilience.

Although shaft 4, sleeve 3 and spring 9 have been described as the driving member, and shaft 13 as the driven member, it should be understood that the coupling would function properly if the reverse were true. In other words, shaft 13 could be the driving member, and shaft 4, sleeve 3 and spring 9 could constitute the driven member.

As indicated heretofore, one of the advantages of the above-described coupling is the ease and rapidity with which the driving and driven members may be coupled together or uncoupled. To uncouple the members, they are axially moved apart from one another sliding spring end 11 out of groove 16. As soon as spring end 11 clears groove 16, the members are uncoupled. Thus uncoupling may be accomplished with equal facility whether the members are stationary or rotating. To couple the members together, it is only necessary to move the members axially into engagement with one another causing the end 14 of shaft 13 to enter sleeve 3. If groove 16 is not in alignment with spring end 11, spherical end 14 merely cams spring end 11 radially outwardly relative to slot 12 upon insertion of shaft 13 into sleeve 3 with spring end 11 bearing on the periphery of shaft 13 or its ball end 14. As soon as the driving member rotates with respect to the driven member, spring end 11 and groove 16 are moved into register with one another, and spring end 11 is urged by its own resiliency into groove 16 coupling the two members together. As in the case of the uncoupling operation, the coupling of the members can be accomplished with equal facility whether the driving member is stationary or rotating.

The invention has been described in detail with particular reference to a preferred embodiment thereof, but it will be understood that variations and modifications can be effected within the spirit and scope of the invention as described hereinabove and as defined in the appended claims.

I claim:

1. In a coupling for transmitting rotary motion, the combination comprising: a first shaft; a sleeve fixedly mounted on and extending from one end of said shaft, said sleeve having an elongated axially extending slot; a helical spring its helical portion embracing the periphery of said sleeve, and having a free end bent substantially at right angles to the plane of the coils of said helical portion, said first end further being bent radially inwardly and outwardly in a substantially V-shaped configuration and extending through said slot substantially to the axis of said first shaft; and a second shaft having a spherical end of a diameter slightly smaller than the inner diameter of said sleeve, an undercut portion adjacent said spherical end and in register with said sleeve, and an elongated axially extending peripheral groove in said spherical end and undercut portion adapted to receive a portion of said free end of said spring for releasably coupling said driving and driven members for transmission of rotary motion from the former to the latter when said second shaft is positioned in said sleeve.

2. In a coupling for transmitting rotary motion, the combination comprising: a driving member; a driven member; one of said members terminating in an open ended tubular member of a predetermined inner diameter, the wall of which is provided with an elongated axially extending slot extending therethrough, and a spring member having one end connected to the periphery of said one member and having a free end extending axially of said member and radially inwardly through said slot substantially to the axis of said tubular member with at least two spaced-apart portions of said free end extending transversely of said slot; and said other member having a spherical end of a diameter substantially equal to said predetermined inner diameter and slidably insertable in said tubular member into a coupled position, the portion of said other member adjacent said spherical end having a diameter less than said predetermined diameter extending beyond the open end of said tubular member when the members are in coupled position, thereby permitting pivotal movement of said members relative to one another while in said coupled position, said other member further having an axially extending groove adapted to receive said free end of said spring for transmission of rotary motion between said members when said members are in said coupled position.

3. The invention according to claim 2 wherein said free end of said spring is bent into a V-shaped configuration to form said two spaced-apart portions, and the end of said tubular member is beveled to facilitate insertion of said spherical end.

4. In a coupling for transmitting rotary motion, the combination comprising: a driving member; a driven member; one of said members having a tubular end provided with an elongated axially extending slot, and a spring member having a helical portion embracing the periphery of said one member and having a free end bent substantially at right angles to the plane of the coils of said helical portion, said free end further being bent radially inwardly and outwardly in a substantially V-shaped configuration and extending through said slot substantially to the axis of said one member with at least two spaced-apart portions of said free end extending transversely of said slot; and said other member having an end portion slidably insertable in said tubular end, said end portion having an axially extending groove adapted to receive said free end of said spring for releasably coupling said driving and driven members for transmission of rotary motion therebetween when said end portion is positioned in said tubular end of the first-mentioned member.

References Cited in the file of this patent

UNITED STATES PATENTS

| | | |
|---|---|---|
| 204,812 | Gladding | June 11, 1878 |
| 882,171 | Schoenner | Mar. 17, 1908 |
| 985,135 | Bigelow | Feb. 28, 1911 |